(12) United States Patent
Thorsson

(10) Patent No.: US 8,091,712 B2
(45) Date of Patent: Jan. 10, 2012

(54) METHOD FOR BATCHING ITEMS

(75) Inventor: Brynjolfur Thorsson, Reykjavik (IS)

(73) Assignee: Marel Food Systems HF, Gardabaer (IS)

( * ) Notice: Subject to any disclaimer, the term of this patent is extended or adjusted under 35 U.S.C. 154(b) by 487 days.

(21) Appl. No.: 11/992,126

(22) PCT Filed: Sep. 25, 2006

(86) PCT No.: PCT/IS2006/000019
§ 371 (c)(1),
(2), (4) Date: Mar. 17, 2008

(87) PCT Pub. No.: WO2007/034512
PCT Pub. Date: Mar. 29, 2007

(65) Prior Publication Data
US 2010/0147750 A1     Jun. 17, 2010

(30) Foreign Application Priority Data
Sep. 23, 2005   (IS) .............................................. 8044

(51) Int. Cl.
*B07C 5/00* (2006.01)

(52) U.S. Cl. ......... 209/559; 209/580; 209/586; 209/592

(58) Field of Classification Search ................... 209/559, 209/576, 580, 586, 592, 939
See application file for complete search history.

(56) References Cited

U.S. PATENT DOCUMENTS

| | | | |
|---|---|---|---|
| 5,184,733 A | 2/1993 | Arnarson et al. | |
| 5,406,770 A * | 4/1995 | Fikacek | 53/54 |
| 6,268,571 B1 * | 7/2001 | Benyukhis | 177/25.18 |
| 6,546,304 B2 * | 4/2003 | Thorvaldsson et al. | 700/115 |
| 6,898,482 B2 * | 5/2005 | Thorvaldsson et al. | 700/213 |
| 7,383,695 B2 * | 6/2008 | Lehman et al. | 65/29.16 |
| 2007/0293980 A1 * | 12/2007 | Gudjonsson et al. | 700/223 |

FOREIGN PATENT DOCUMENTS

| | | |
|---|---|---|
| WO | WO 00/48909 | 8/2000 |
| WO | WO 01/27567 A2 | 4/2001 |
| WO | WO 2005047829 A1 * | 5/2005 |

OTHER PUBLICATIONS

International Search Report for PCT/IS2006/000019 mailed Nov. 30, 2006.
International Preliminary Report on Patentability and Written Opinion of the International Searching Authority, mailed Apr. 3, 2008, in corresponding Application Serial No. PCT/IS2006/000019.

* cited by examiner

*Primary Examiner* — Joseph C Rodriguez
(74) *Attorney, Agent, or Firm* — Nixon & Vanderhye, P.C.

(57) ABSTRACT

A method and a computer program product for batching items are disclosed including the steps of: selecting a first item for a batch, analyzing the characteristics of the selected item, creating a profile of the selected item, and determining qualification criteria for forthcoming items. The qualification criteria for the forthcoming items based on the profile created from the first item selected for the batch with the analysis of the characteristics of an item based on one or more of the following: weighing the item, recording and processing an image of the item, for determining one or more of the following characteristics: the thickness of the item, the color of the item, and/or the shape of the item. The characteristics are used for creating a profile of the item.

6 Claims, 3 Drawing Sheets ical Field

The present invention relates to the field of batching items, more precisely, to the batching of items of similar characteristics.

BACKGROUND ART

In various industries, items are sold in batches satisfying various constraints. As an example, items of non-uniform size, shape or weight, e.g. food items such as meat, fish, fruit and vegetables, are typically handled and delivered to customers in batches having a substantially uniform size, shape and weight. Typically, a batch of items must fulfill requirements defined by a contract between a delivering and a receiving part, and often, number of items and minimum weight of the batch are key issues. Normally, the part of the batch that exceeds the minimum weight is considered by the delivering part as a loss and is often referred to as "giveaway", "overweight" or "overpack".

Typically, batches are formed by weighing the items individually, e.g. as they are moved by a conveyer system across a dynamic scale. In a computer system, the weight of each item is compared, with weights of a plurality of receptacles, e.g. bins wherein batches are formed. Often, the computer system uses statistical algorithms for assigning specific items to specific bins under consideration of required minimum weight of the batch and a desire not to produce batches with more overweight, i.e. giveaway, than required under the present conditions, i.e. given the weights of the items and the required minimum weight of the batches. The problem with prior art methods such as the one disclosed in WO 01/27567 is that global characteristics are defined for all the items to be batched, where the user determines these characteristics before the batching is initiated.

Evidently, there is a correlation between the amount of giveaway, the required minimum weight of the batches, and the weight distribution of the items being batched. In general, the larger the items are and the smaller the batches are, the more giveaway is expected.

As previously discussed, conventional batching methods are used to batch items into batches of fixed weight and item count. As an example the goal might be to make batches weighing 300 grams and exactly 3 items. In this case there is a fixed relationship between the average item weight and the average batch weight. Therefore, the overweight is simply the difference between the item count times the average item weight and the minimum allowable batch weight.

DISCLOSURE OF THE INVENTION

Commonly, the well-known batching methods only consider one characteristic of the item being batched, namely the weight. This fact is often the cause of customer dissatisfaction. For example, when buying food items such as a steak it is possibly desirable for the customer if all the steaks are of the same thickness. Similarly, it is advantageous for the retailer if all the slices of a meat in a packing are of relatively the same color since the customers tend to think that red colored meat is a main indication of quality meat.

There is a growing need for a new approach to batching food items based on the characteristic of the available items. The present invention provides an intelligent batching method for creating batches not only/necessarily of uniform weight, but rather of items uniform characteristics such as color, thickness, weight, or shape to name few. The present invention provided a method and a computer program for batching items, where the first item in each new batch sets the characteristics for each new batch formed.

In one aspect the present invention relates to a method for batching items, said method comprising the steps of: selecting a first item for a batch, analyze the characteristics of said selected item, create a profile of said selected item, determine qualification criteria for forthcoming items, wherein said qualification criteria for forthcoming items is based on said profile created from said first item selected for said batch. Analyzing the characteristics of an item is based on one or more of the following: weighing said item, record and process an image of said item, for determining one or more of the following characteristics: thickness of said item, color of said item, shape of said item, wherein said characteristics are used for creating a profile of said item.

In another aspect the present invention relates to a computer program product directly loadable into the internal memory of a digital computer, comprising software code portions for: interacting with the computer operator, and to perform the method described above when said product is run on a computer.

In another aspect the present invention relates to a computer program product for operating a computer, said computer program product comprising: computer readable medium; first program instruction means, recorded on said medium, for instructing a computer processor to control interaction between an operator and said computer program product via human machine interface; second program instruction means, recorded on said medium, for instructing a computer processor to select a first item from a batch; third program instruction means, recorded on said medium, for instructing a computer processor to gather information and analyze said first item; fourth program instruction means, recorded on said medium, for instructing a computer processor to create a profile, according to the result of analyzing said first item, to use as qualification criteria for selecting forthcoming items in the batch; fifth program instruction means, recorded on said medium, for instructing a computer processor to select forthcoming items in a batch according to said profile, optionally a sixth program instruction means, recorded on said medium, for instructing a computer processor to retrieve information related to selected items from a database; optionally a seventh program instruction means, recorded on said medium, for instructing a computer processor to record in said database information about the batch being collected; wherein said database stores some or all information about said items needed to create said profile, and information about the content of said batches.

In an embodiment of the present invention the items determine the characteristics of each batch. The characteristics of a first item, which does not comprise the desired characteristics for any of the existing batches, determines the characteristics of a new batch. The items determine the characteristics of each batch based on predefined rules, but each batch is not defined prior to the selection of items. The method further comprises selecting a first item for a batch, where said item is analyzed for predetermined characteristics. A profile of said selected item is created and then a qualification criteria for the item is determined. Thereafter, the select first item determines the characteristics of the batch into which said first item is batched and the qualification criteria for forthcoming items is based on said profile created from said first item selected for said batch. When a second item is selected, which does not comprise the desired characteristics for any of the existing batches the same process is repeated.

DESCRIPTION

The present invention can be adapted to a range of batching systems irrespective of how the batching is physically performed, and the implementation, and application of the invention being described in the following text can obviously be varied in many ways. Such variations are not to be regarded as a departure from the spirit and scope of the present invention, and all such modifications as would be obvious to one skilled in the art are intended to be included within the scope of the following claims.

Figure 1:
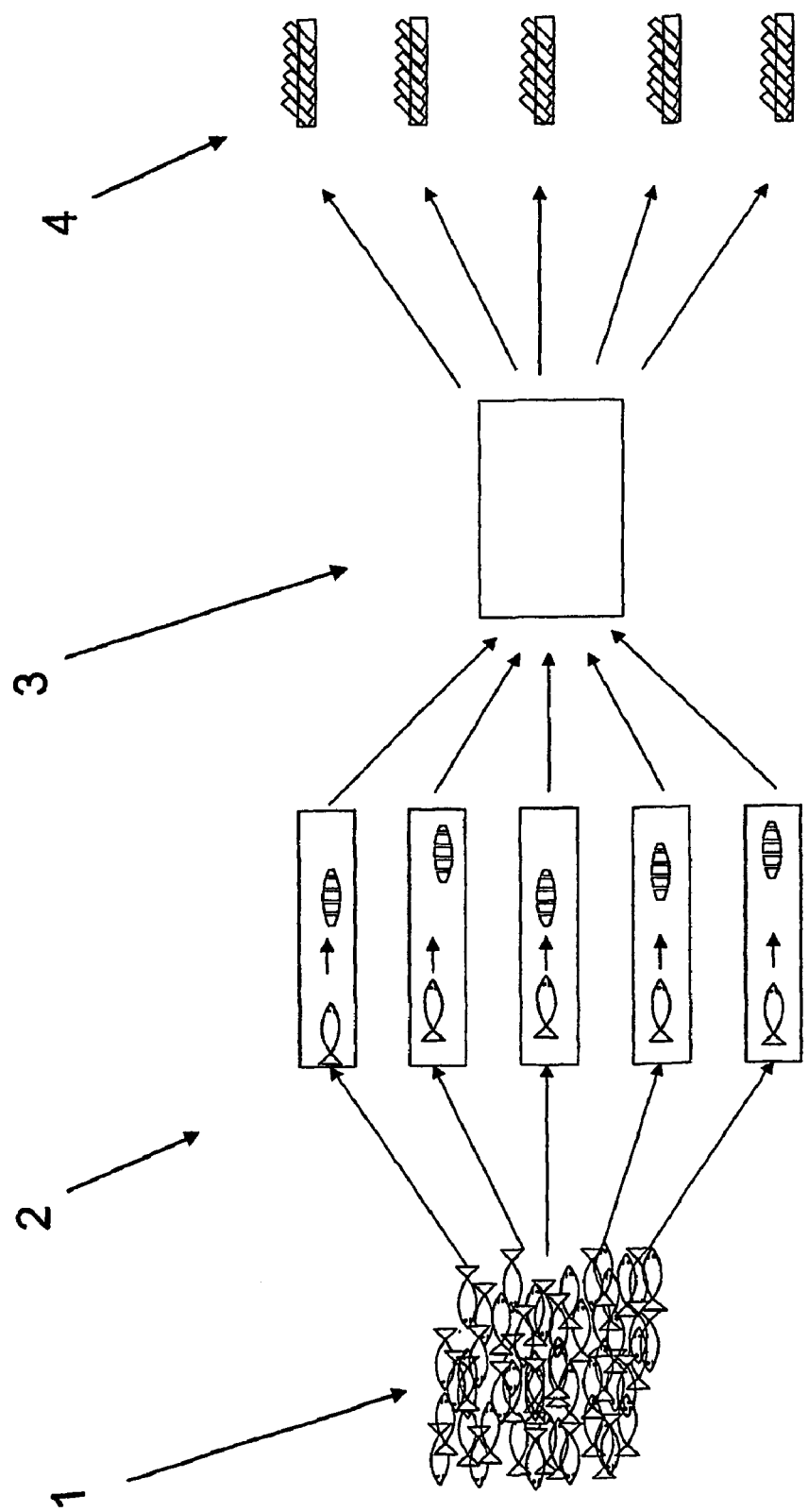
FIG. 1, shows a fish processing plant, processing salmon slices.

In one embodiment the method is adapted for use in the in the salmon industry FIG. 1. The salmon (1) undergoes a process (2) were the filets are removed from the spine and sliced. The slices are batched together (3) to form some batches (4) of predetermined weight. The salmon filets, however, often have a slightly different color. The consumer perceives the different colors as indication of poor quality. Therefore, in the salmon industry it is of an outmost importance to be able to select the pieces according to both weight and color.

Figure 2:
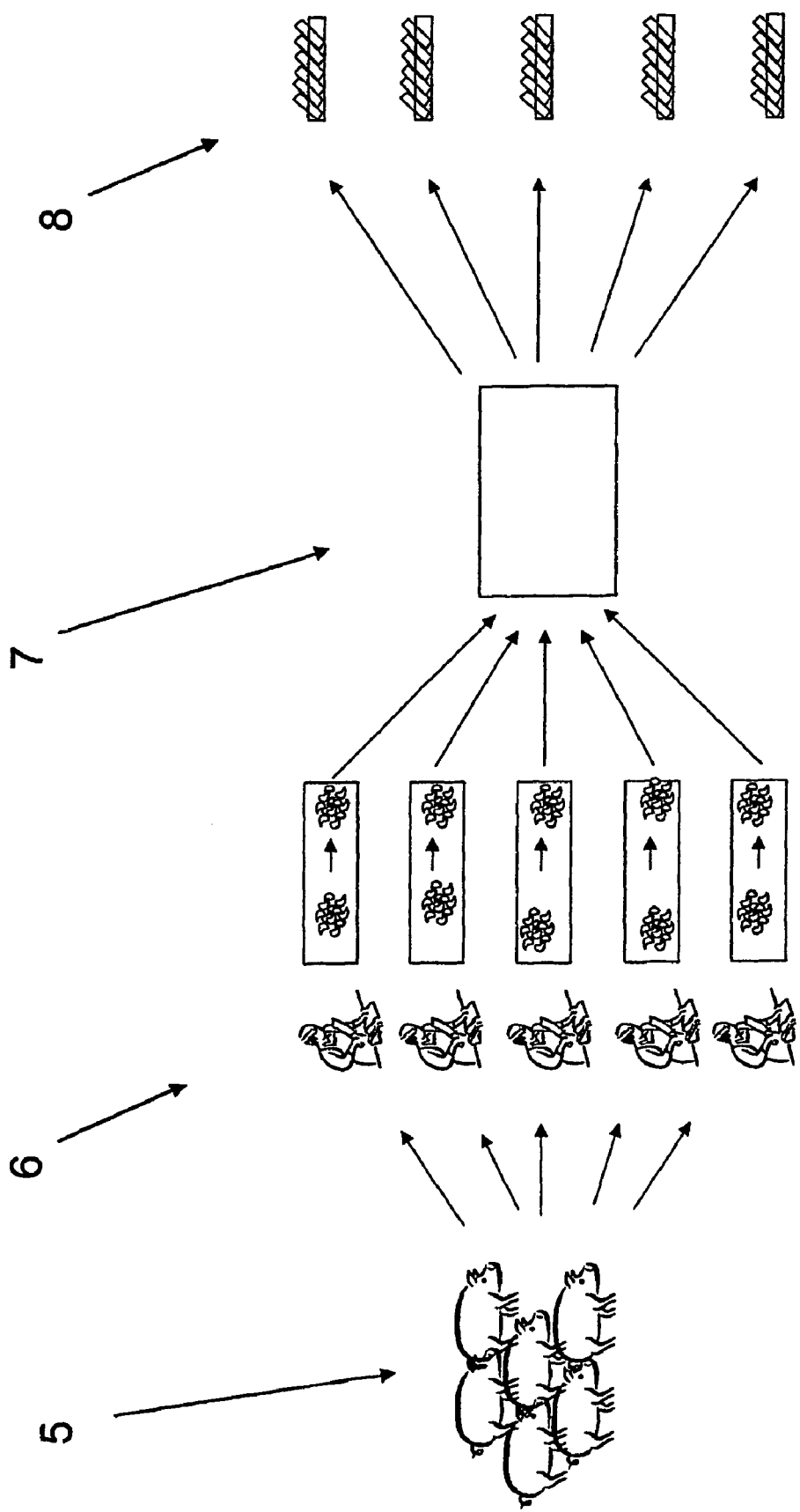
FIG. 2, shows meat processing plant, processing pork chops.

In another embodiment the method is adapted for use in a meat processing industry FIG. 2. This example uses the processing of pork (5). The color of pork chops is classified into six shades of red. As a quality measure each packing is limited to include meat with adjacent color shades. Therefore, in a packing of pork chops of "shade two" it is acceptable to find chop of "shade one" and chop of "shade three" along with "shade two" chops. However, in a packing of "shade one" only chops of "shade one" and "shade two" are acceptable. Therefore, to maximize the value of the final product it is desirable to select items for packing of like color. Color coordination could of course take place during the processing of the meat (6), however, the same can be implemented on the fly during the batching process (7). Therefore, the pork chops can be batched together, and packed, according to both color and weight. Thus increasing the product value in each packing (8).

Figure 3:
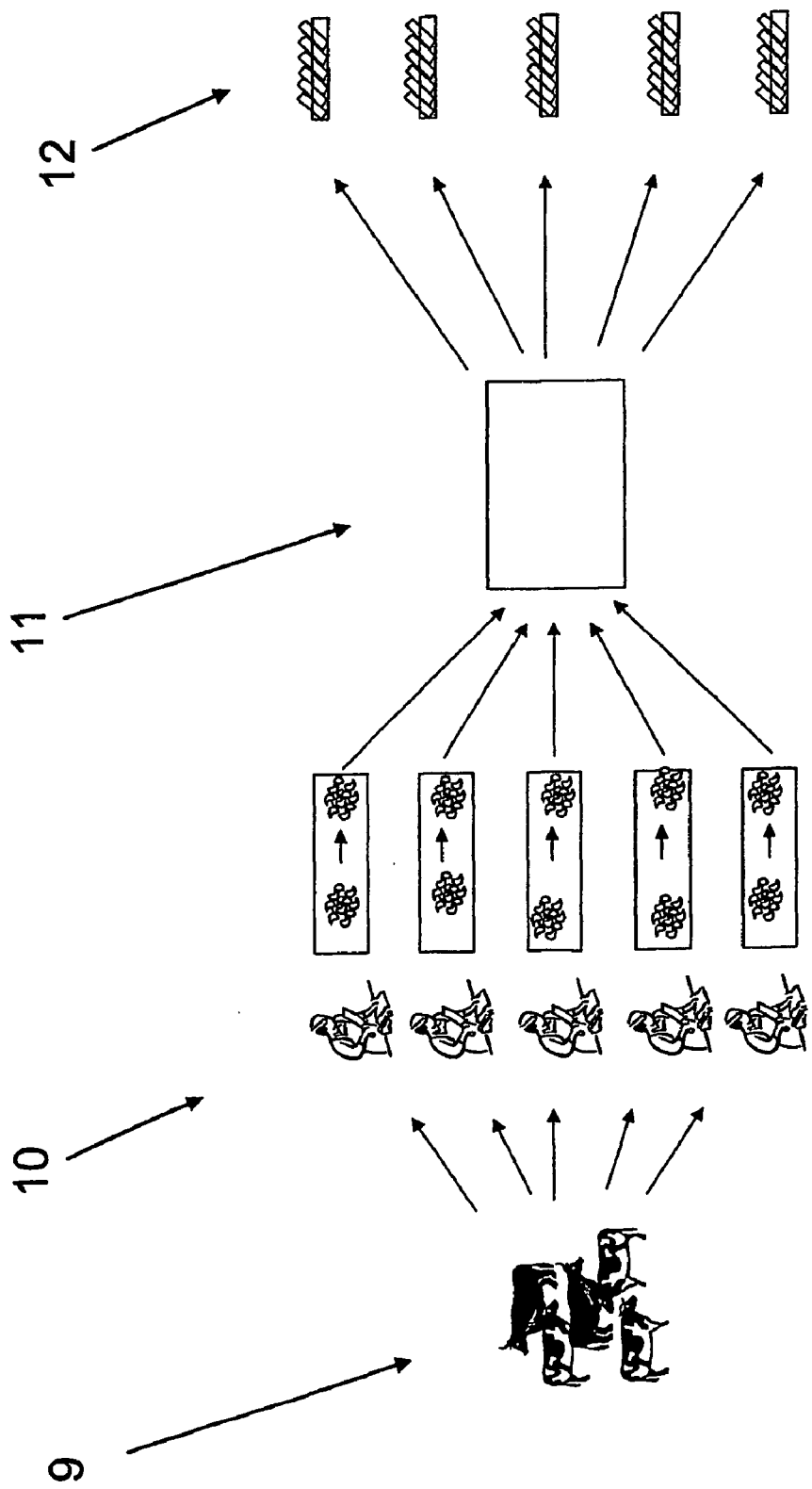
FIG. 3, shows meat processing plant, processing beef steaks.

In another embodiment the method is adapted for use in a meat processing industry FIG. 3. This example uses the processing of beef (9). As in the previous example, color of the meat is perceived by the consumer as a quality measure. But the consumer might be looking for other measures as well such as the thickness of the steaks. Uneven thickness requires different time for preferred cooking. For example one family of four grownups could be interested in buying a packing of four steaks that are all very uniform so the preferred cooking time would be even and there would be one steak per person. In this scenario, the weight of the packing might not be the most important factor. It would be more important to get four steaks of same size, same thickness, and same color. Therefore, the main goal for optimizing value of the product may no longer be the uniform weight but rather to meet the need of the customer when selecting steaks. Size coordination could of course take place during the processing of the meat (10), however, the same can be implemented on the fly during the batching process (11). Therefore, the steaks can be batched together and packed according to color, size, and thickness thus increasing the product value in each packing (12).

INDUSTRIAL APPLICABILITY

The ultimate goal of any for-profit company is to make money. Optimal utilization of the raw material available is therefore of major interest. In the food packing Industry the goal is often to minimize the overweight (or giveaway) in each product pack. The present invention provides a novel way of improving the profit by batching together products according to multiple criteria.

The invention claimed is:

1. A method for batching items, said method comprising the steps of:
    selecting a first item for a batch,
    analyzing the characteristics of said selected item,
    creating a profile of said selected item,
    determining qualification criteria for forthcoming items,
    forming batches with items having desired characteristics,
    the selected first item determining the characteristics of the batch into which said first item is batched, and
    the qualification criteria for forthcoming items being based on said profile created from said first item selected for said batch,
    the characteristics of an item, which do not comprise the desired characteristics for any existing batches, determining the characteristics of a new batch.

2. The method according to claim 1, wherein the first item selected is the first available item.

3. The method according to claim 1, wherein the first item selected is selected at random from a pool of available items.

4. The method according to claim 1, wherein the first item selected is selected according to a predetermined selection criterion.

5. The method according to claim 1, wherein the step of analyzing the characteristics of an item is comprised of one or more of the steps of:
    weighing said item,
    recording an image of said item,
    processing said image of said item for determining one or more of the following characteristics:
        thickness of said item,
        color of said item,
        shape of said item,
    wherein said characteristics are used for creating a profile of said item.

6. The method according to claim 1, wherein the items determine the characteristics of each batch based on pre-defined rules.

\* \* \* \* \*